United States Patent
Moshfeghi

(10) Patent No.: US 8,421,676 B2
(45) Date of Patent: Apr. 16, 2013

(54) METHOD AND SYSTEM FOR DETERMINING THE LOCATION OF AN ELECTRONIC DEVICE USING MULTI-TONE FREQUENCY SIGNALS

(75) Inventor: Mehran Moshfeghi, Rancho Palo Verdes, CA (US)

(73) Assignee: Golba LLC, Ranchos Palos Verdes, CA (US)

( * ) Notice: Subject to any disclaimer, the term of this patent is extended or adjusted under 35 U.S.C. 154(b) by 295 days.

(21) Appl. No.: 12/843,868

(22) Filed: Jul. 26, 2010

(65) Prior Publication Data

US 2011/0043407 A1    Feb. 24, 2011

Related U.S. Application Data

(63) Continuation of application No. 12/059,558, filed on Mar. 31, 2008, now Pat. No. 7,800,541.

(51) Int. Cl.
G01S 3/02 (2006.01)
G01S 5/04 (2006.01)

(52) U.S. Cl.
USPC .............. 342/463; 342/442; 342/458

(58) Field of Classification Search .......... 342/442, 342/444, 453, 457–458, 463–465; 455/456.2, 455/456.3, 457
See application file for complete search history.

(56) References Cited

U.S. PATENT DOCUMENTS

| | | | |
|---|---|---|---|
| 3,303,501 A | 2/1967 | Mahoney |
| 3,778,159 A | 12/1973 | Hines et al. |
| 4,283,726 A | 8/1981 | Spence et al. |
| 4,851,851 A | 7/1989 | Hane |
| 5,365,516 A | 11/1994 | Jandrell |
| 5,874,914 A | 2/1999 | Krasner |
| 5,999,124 A | 12/1999 | Sheynblat |
| 6,131,067 A | 10/2000 | Girerd et al. |
| 6,185,427 B1 | 2/2001 | Krasner et al. |
| 6,204,765 B1 | 3/2001 | Brady et al. |
| 6,215,441 B1 | 4/2001 | Moeglein et al. |
| 6,295,019 B1 | 9/2001 | Richards et al. |
| 6,496,806 B1 | 12/2002 | Horwitz et al. |
| 6,577,238 B1 | 6/2003 | Whitesmith et al. |
| 6,659,344 B2 | 12/2003 | Otto et al. |

(Continued)

FOREIGN PATENT DOCUMENTS

| | | |
|---|---|---|
| JP | 2006-112822 | 4/2006 |
| WO | WO 2005/091997 | 10/2005 |
| WO | WO 2007/056333 | 5/2007 |
| WO | WO 2009/124071 | 10/2009 |

OTHER PUBLICATIONS

Portions of prosecution history of U.S. Appl. No. 12/833,938, Feb. 15, 2012, Moshfeghi, Mehran.
Portions of prosecution history of U.S. Appl. No. 12/852,443, Mar. 12, 2012, Moshfeghi, Mehran.

(Continued)

*Primary Examiner* — Dao Phan
(74) *Attorney, Agent, or Firm* — Adeli & Tollen LLP

(57) ABSTRACT

Embodiments of the present invention include a method of determining a location of a mobile device. The method comprises transmitting a signal between a plurality of known locations and receiving signal at device of unknown location such as a mobile device. The signal may include multiple tones having different frequencies and resulting in sets of residual phase differences. The location of the mobile device may be determined using the known locations and the frequency and phase differences between the transmitted tones. In one embodiment, OFDM signals may be used between an access point and mobile device, for example, to determine the location of the mobile device.

20 Claims, 8 Drawing Sheets

U.S. PATENT DOCUMENTS

| | | | |
|---|---|---|---|
| 6,693,592 | B2 | 2/2004 | Dowdle et al. |
| 6,717,516 | B2 | 4/2004 | Bridgelall |
| 6,731,908 | B2 | 5/2004 | Berliner et al. |
| 6,750,769 | B1 | 6/2004 | Smith |
| 6,859,761 | B2 | 2/2005 | Bensky et al. |
| 6,868,073 | B1 | 3/2005 | Carrender |
| 6,920,330 | B2 | 7/2005 | Caronni et al. |
| 7,026,935 | B2 | 4/2006 | Diorio et al. |
| 7,038,573 | B2 | 5/2006 | Bann |
| 7,045,996 | B2 | 5/2006 | Lyon et al. |
| 7,057,492 | B2 | 6/2006 | Jackson et al. |
| 7,119,736 | B2 | 10/2006 | Heide et al. |
| 7,119,738 | B2 | 10/2006 | Bridgelall et al. |
| 7,161,470 | B2 | 1/2007 | Berquist et al. |
| 7,205,931 | B2 | 4/2007 | Gila et al. |
| 7,228,228 | B2 | 6/2007 | Bartlett et al. |
| 7,548,153 | B2 | 6/2009 | Gravelle et al. |
| 7,580,378 | B2 | 8/2009 | Carrender et al. |
| 7,800,541 | B2 | 9/2010 | Moshfeghi |
| 2003/0176196 | A1 | 9/2003 | Hall et al. |
| 2004/0002305 | A1 | 1/2004 | Byman-Kivivuori et al. |
| 2004/0185873 | A1 | 9/2004 | Gilkes et al. |
| 2004/0243588 | A1 | 12/2004 | Tanner et al. |
| 2004/0260506 | A1 | 12/2004 | Jones et al. |
| 2005/0030160 | A1 | 2/2005 | Goren et al. |
| 2005/0036460 | A1 | 2/2005 | Dougherty et al. |
| 2005/0088284 | A1 | 4/2005 | Zai et al. |
| 2005/0129139 | A1 | 6/2005 | Jones et al. |
| 2005/0198228 | A1 | 9/2005 | Bajwa et al. |
| 2005/0237953 | A1 | 10/2005 | Carrender et al. |
| 2005/0242188 | A1 | 11/2005 | Vesuna |
| 2005/0245235 | A1 | 11/2005 | Vesuna |
| 2006/0012465 | A1 | 1/2006 | Lee et al. |
| 2006/0068750 | A1 | 3/2006 | Burr |
| 2006/0114104 | A1 | 6/2006 | Scaramozzino |
| 2006/0170565 | A1 | 8/2006 | Husak et al. |
| 2006/0170591 | A1 | 8/2006 | Houri |
| 2006/0197652 | A1 | 9/2006 | Hild et al. |
| 2006/0217131 | A1 | 9/2006 | Alizadeh-Shabdiz et al. |
| 2006/0267731 | A1 | 11/2006 | Chen |
| 2007/0045424 | A1 | 3/2007 | Wang |
| 2007/0046467 | A1 | 3/2007 | Chakraborty et al. |
| 2007/0075838 | A1 | 4/2007 | Powell |
| 2007/0099627 | A1 | 5/2007 | Kofol et al. |
| 2007/0103303 | A1 | 5/2007 | Shoarinejad |
| 2007/0216540 | A1 | 9/2007 | Riley et al. |
| 2007/0252758 | A1 | 11/2007 | Loomis |
| 2008/0008109 | A1 | 1/2008 | Ollis |
| 2008/0045236 | A1 | 2/2008 | Nahon et al. |
| 2008/0088452 | A1 | 4/2008 | Agrawal et al. |
| 2008/0143482 | A1 | 6/2008 | Shoarinejad et al. |
| 2008/0143584 | A1 | 6/2008 | Shoarinejad et al. |
| 2008/0167049 | A1 | 7/2008 | Karr et al. |
| 2008/0278328 | A1 | 11/2008 | Chand et al. |
| 2008/0284646 | A1 | 11/2008 | Walley et al. |
| 2008/0318579 | A1 | 12/2008 | McCoy et al. |
| 2009/0033462 | A1 | 2/2009 | Kitayoshi et al. |
| 2009/0121927 | A1 | 5/2009 | Moshfeghi |
| 2010/0271263 | A1 | 10/2010 | Moshfeghi |
| 2010/0309051 | A1 | 12/2010 | Moshfeghi |

OTHER PUBLICATIONS

Want, Roy., et al., "The Active Badge Location System", ACM Trans. Inf. Syst., 10(1): pp. 91-102, Month Unknown, 1992.

Harter, Andy, et al., "A Distributed Location System for the Active Office", IEEE Network, Jan. 1994, vol. 8, No. 1.

Bahl, Paramvir, et al., "RADAR: An In-Building RF Based User Location and Tracking System", in Proceedings of IEEE Infocom, Mar. 2000, pp. 775-784, vol. 2.

Muthukrishnan, Kavitha, et al., "Towards Smart Surroundings: Enabling Techniques and Technologies for Localization." In: 1st Int. Workshop on Location- and Context-Awareness (LoCA), May 2005, pp. 350-362, University of Twente, the Netherlands.

Lamarca, Anthony, et al., "Place Lab: Device Positioning Using Radio Beacons in the Wild." In Pervasive Computing, Month Unknown, 2005, pp. 116-133.

Turin, G., et al., "Simulation of Urban Vehicle-Monitoring Systems", IEEE Transactions on Vehicular Technology, Feb. 1972, pp. 9-16, vol. VT-21, No. 1.

Maes, Pattie, et al., "Unveiling the "Sixth Sense," Game Changing Wearable Tech." TED 2009, Long Beach, CA USA, Month Unknown, 2009 http://www.ted.com/index.php/talks/pattie_maes_demos_the_sixth_sense.html the source video / home page (A1, A2) for the Video Clip.

Portions of prosecution history of U.S. Appl. No. 11/641,623, Jan. 25, 2010, Shoarinejad, Kambiz, et al.

Portions of prosecution history of U.S. Appl. No. 12/059,558, Aug. 20, 2010, Moshfeghi, Mehran.

Author Unknown, "Auto-ID Savant Specification 1.0", Sep. 2003, pp. 1-58, Auto-ID Center.

Author Unknown, "Cisco Application-Oriented Networking Facilitates Intelligent Radio Frequency Identification Processing at the Edge," Month Unknown, 2005, pp. 1-9, Cisco Systems.

Author Unknown, "ConnecTerra Product Family," www.connecterra.com, Month Unknown, 2005, pp. 1-2, Connecterra.

Author Unknown, "Delivering an Intelligent Foundation for RFID: Maximizing Network Efficiency With Cisco RFID Solutions," Month Unknown, 2005, pp. 1-6, Cisco Systems.

Author Unknown, "Establishing the Foundation for Enterprise-Scale RFID Deployments," www.connecterra.com/products/rftagaware.php, Sep. 2005, pp. 1-2, ConnecTerra.

Author Unknown, "Four Challenges," Month Unknown, 2004, pp. 1-7, ConnecTerra.

Author Unknown, "Installation Manual R500HA Long Range RFID Reader," www.iautomate.com, Month Unknown, 2005, pp. 1-40, iAutomate.

Author Unknown, "Issues on range and accuracy of RFID-radar™ system," RFID-radar accuracy report, Feb. 2, 2006, pp. 1-4, Trolley Scan Ltd.

Author Unknown, "OFDM for Mobile Data Communications," International Engineering Consortium, www.iec.org/online/tuturals/ofdm/index.html, Month Unknown, 2007.

Author Unknown, "RFTagAware™ Enterprise Server, Centralized EPC Data Management and Reporting for Enterprise-Scale RFID Deployments", www.connecterra.com, Month Unknown, 2005, pp. 1-2, Connecterra.

Author Unknown, "The Sun Global RFID Network Vision: Connecting Businesses at the Edge of the Network," A Technical White Paper, Jul. 2004, pp. 1-20, Sun Microsystems.

Chon, Hae Don, et al., "Using RFID for Accurate Positioning," Journal of Global Positioning Systems, Feb. 3, 2005, pp. 32-39, vol. 3, No. 1-2.

Chun, Sebum, et al., "Performance Analysis of GPS Integer Ambiguity Resolution Using External Aiding Information," Journal of Global Positioning Systems, Month Unknown, 2005, pp. 201-206, vol. 4, No. 1-2.

Gustafsson, Fredrik, et al., "Mobile Positioning Using Wireless Networks," IEEE Signal Processing Magazine, Jul. 2005, pp. 41-53.

Kim, Donghyun, et al. "GPS Ambiguity Resolution and Validation: Methodologies, Trends and Issues," 7th GNSS Workshop—International Symposium on GPS/GNSS, Nov. 30-Dec. 2, 2000, Seoul, Korea.

Kulyukin, Vladimir, et al., "RFID in Robot-Assisted Indoor Navigation for the Visually Impaired," Research Paper, Feb. 2004, Utah State University.

Miller, Leonard E., "Why UWB? A Review of Ultrawideband Technology," National Institute of Standards and Technology, DARPA, Apr. 2003, pp. 1-72, Gaithersburg, Maryland.

Miller, Leonard E., "Wireless Technologies and the SAFECOM SoR for Public Safety Communications," National Institute of Standards Technology, Month Unknown, 2005, pp. 1-68, Gaithersburg, Maryland.

Okabe, Masanobu, et al. "A Car Navigation System Utilizing a GPS Receiver," IEEE, Mar. 1993, pp. 278-279.

Patwari, Neal, et al., "Locating the Nodes," IEEE Signal Processing Magazine, Jul. 2005, pp. 54-69.

Philipose, Matthai, et al., "Mapping and Localization with RFID Technology," Intel Research White Paper, Dec. 2003.

Reynolds, Matthew, et al., "Design Considerations for embedded software-defined RFID Readers", Emerging Wireless Technology/ A Supplement to RF Design, Aug. 2005, pp. 14-15.

Sayed, Ali H., et al., "Network-Based Wireless Location," IEEE Signal Processing Magazine, Jul. 2005, pp. 24-40.

Sun, Guolin, et al., "Signal Processing Techniques in Network-Aided Positioning", IEEE Signal Processing Magazine, Jul. 2005, pp. 12-23.

International Search Report and Written Opinion for PCT/US2009/038992, May 20, 2009 (mailing date), Radiofy LLC.

International Preliminary Report on Patentability for PCT/US2009/038992, Oct. 5, 2010 (date of issuance), Radiofy LLC.

METHOD AND SYSTEM FOR DETERMINING THE LOCATION OF AN ELECTRONIC DEVICE USING MULTI-TONE FREQUENCY SIGNALS

CLAIM OF BENEFIT TO PRIOR APPLICATIONS

This application is a continuation application of U.S. patent application Ser. No. 12/059,558, entitled "Methods and Systems for Determining the Location of an Electronic Device", filed Mar. 31, 2008, now issued as U.S. Pat. No. 7,800,541. The contents of U.S. patent application Ser. No. 12/059,558, now issued as U.S. Pat. No. 7,800,541, are hereby incorporated by reference.

BACKGROUND

The present invention relates to determining the location of an electronic device, and in particular, to methods and systems for determining the location of an electronic device having an unknown location.

As electronic devices such as computers and cell phones have become more prevalent, there is a growing desire to determine the location for such devices for a variety of applications. One of the most prevalent consumer applications has been in travel. One common approach is to use a Global Positioning System ("GPS") to determine location. GPS systems incorporate navigation systems which help the user find their desired destinations. Many of the systems provide navigation with visual and audio cues that aid the user in navigating through streets and highways which may be unfamiliar to the user.

However, GPS systems suffer from a variety of shortcomings. GPS system signals are fairly weak and may not be sufficient to operate in many indoor locations, tunnels, and urban canyons. In large cities such as San Francisco, New York, and Chicago, there are many locations in which GPS signals do not operate or may not provide consistent location data for navigation. For example, if a user takes the subway around the city, the current GPS systems may not be able to determine any locations within the tunnels, and this may lead a user to exit the train at the wrong train station. Also, many destinations in a large metropolitan city may require a vertical coordinate as well as a longitudinal and latitudinal coordinate. For example, a store within a mall may be located on the top level of a building.

Thus, there is a need for improved systems and methods for determining location. The present invention solves these and other problems by providing methods and systems for determining the location of an electronic device.

SUMMARY

Embodiments of the present invention improve methods and systems for determining the location of an electronic device. In one embodiment, the present invention includes a method of determining a location of an electronic device, the method comprising transmitting one or more signals between a first electronic device at an unknown location and three or more electronic devices at three or more corresponding known locations, wherein the one or more signals each include a plurality of tones having different frequencies, determining at least one first phase difference between at least two tones having a first frequency difference in the one or more signals accumulated during transmission between the first electronic device and a first electronic device of said three or more electronic devices, determining at least one second phase difference between at least two tones having a second frequency difference in the one or more signals accumulated during transmission between the first electronic device and a second electronic device of said three or more electronic devices, determining at least one third phase difference between at least two tones having a third frequency difference in the one or more signals accumulated during transmission between the first electronic device and a third electronic device of said three or more electronic devices, and determining the location of said first electronic device using said first, second, and third phase differences and said first, second, and third frequency differences.

In one embodiment, the method further comprises determining a fourth phase difference between at least two tones having a fourth frequency difference in the one or more signals accumulated during transmission between the first electronic device and a fourth electronic device of four or more electronic devices, wherein said determining the location further comprises using the fourth phase difference and the fourth frequency difference. Additional electronic devices at known locations may be used to determine the location of the unknown device.

In one embodiment, the devices at know locations are wireless access points. In one embodiment, the device at the unknown location is a mobile device such as a mobile phone, laptop computer, personal digital assistant, or a handheld computer based system.

In one embodiment, the first, second, and third frequency differences are the same, but the first, second, and third frequency differences may be different.

In one embodiment, the one or more signals comprise orthogonal frequency division multiplexed signals.

In one embodiment, a first signal of the one or more signals comprises first wireless standard and a second signal of the one or more signals comprises a second wireless standard.

In one embodiment, a first signal of the one or more signals is transmitted from the first electronic device of said three or more electronic devices and received by the first electronic device at the unknown location, a second signal of the one or more signals is transmitted from the second electronic device of said three or more electronic devices and received by the first electronic device at the unknown location, and a third signal of the one or more signals is transmitted from the third electronic device of said three or more electronic devices and received by the first electronic device at the unknown location.

In one embodiment, a first signal of the one or more signals is transmitted from the first electronic device at the unknown location and received by the first electronic device of said three or more electronic devices, a second signal of the one or more signals is transmitted from the first electronic device at the unknown location and received by the second electronic device of said three or more electronic devices, a third signal of the one or more signals is transmitted from the first electronic device at the unknown location and received by the third electronic device of said three or more electronic devices.

In one embodiment, the one or more signals is one signal transmitted from the first electronic device at the unknown location and received by each of said three or more electronic devices.

In one embodiment, at least one of said electronic devices comprises a plurality of antennas, and wherein the method comprises determining a first phase difference between at least two tones received by a first antenna of said plurality of antennas, and determining a second phase difference between at least two tones received by a second antenna of said plurality of antennas.

In one embodiment, the first electronic device at the unknown location includes a gyrator, wherein the method further comprises determining a first location of said first electronic device, storing said first location, generating movement vector indicating the movement of the first electronic device relative to first location, and adding the movement vector to the first location to determine a second location.

In one embodiment, the method further comprises estimating the distance between the first electronic device and at least one of said three or more electronic devices using a transmitted power and received power of said one or more signals.

In one embodiment, the method further comprises encoding the transmitted power in at least one signal.

In one embodiment, determining the location further comprises selecting a first integer representing the difference in the integer number of wavelengths of two tones transmitted between the first electronic device and said first electronic device of said three or more electronic devices, selecting a second integer representing the difference in the integer number of wavelengths of two tones transmitted between the first electronic device and said second electronic device of said three or more electronic devices, selecting a third integer representing the difference in the integer number of wavelengths of two tones transmitted between the first electronic device and said third electronic device of said three or more electronic devices, and determining a first distance between the first electronic device and said first electronic device of said three or more electronic devices, a second distance between the first electronic device and said second electronic device of said three or more electronic devices, a third distance between the first electronic device and said third electronic device of said three or more electronic devices using said first, second, and third integers.

In one embodiment, the first, second, and third distances are final distances indicating the location of the first electronic device relative to three of the three or more electronic devices if the first, second, and third distances intersect at a single point.

In one embodiment, the method further comprises estimating the first distance between the first electronic device and said first electronic device of said three or more electronic devices using a transmitted power and received power of said one or more signals and determining said first integer based on said estimated distance.

In one embodiment, the method further comprises determining a plurality of received amplitudes for the plurality of tones, processing one or more of the received amplitudes to determine estimated distances for each tone, weighting the estimated distances based on received amplitude values, and determining the location of said first electronic device using said estimated distances.

In one embodiment, processing comprises normalizing a plurality of received amplitudes. In one embodiment, processing comprises averaging a plurality of received amplitudes and normalizing the received amplitudes to an average amplitude value. In one embodiment, processing comprises determining a highest and a lowest amplitude value of said received amplitudes and normalizing the received amplitudes to said highest and lowest amplitude values.

In one embodiment, the present invention includes a method of determining a location of an electronic device comprising determining a first distance between a first electronic device having an unknown location and a second electronic device having a known location, determining the first distance comprising generating a plurality of tones having a plurality of frequencies, modulating the tones with a carrier frequency to produce a first signal, transmitting the first signal between the first electronic device and the second electronic device, receiving the first signal, demodulating the first signal to extract the plurality of tones, extracting the phase of at least a portion of the plurality of tones, and determining phase differences between tones at different frequencies, each phase difference having a corresponding frequency difference, determining a second distance between the first electronic device having the unknown location and a third electronic device having a known location, determining the second distance comprising the same method as determining the first distance, determining a third distance between the first electronic device having the unknown location and a fourth electronic device having a known location, determining the third distance comprising the same method as determining the first distance, and calculating the first, second, and third distances based on the phase differences and corresponding frequency differences, and determining the location of said first electronic device based on said first, second, and third distances.

In one embodiment, the method further comprises extracting an amplitude for each of said plurality of tones, estimating the first, second, and third distances using said extracted amplitudes and a transmitted power value, selecting a first integer representing the difference in the integer number of wavelengths of two tones transmitted between the first electronic device and the second electronic device, a second integer representing the difference in the integer number of wavelengths of two tones transmitted between the first electronic device and the third electronic device, and a third integer representing the difference in the integer number of wavelengths of two tones transmitted between the first electronic device and the third electronic device, wherein the integers are selected based on the estimated first, second, and third distances, and calculating the first, second, and third distances based on the first, second, and third integers.

In one embodiment, the method further comprises determining a fourth distance between the first electronic device having the unknown location and a fifth electronic device having a known location, determining the fourth distance comprising the same method as determining the first distance, calculating the fourth distances based on the phase differences and corresponding frequency differences; and determining the location of said first electronic device based on said first, second, third, and fourth distances.

In one embodiment, the present invention includes a system that employs a multi-tone OFDM signal. A signal travels between a known location transmitter (e.g. a wireless access point/base-station) and a receiver (e.g. a wireless mobile device). An OFDM range engine uses the estimated channel frequency response vector to calculate the residual phase differences between frequency tone pairs and also extracts amplitude information for each tone. This process is repeated with other transmitters with known locations. All the calculated residual phase differences and amplitude information are then processed by a location engine to locate the mobile device. A standard OFDM transmitter may be used for the system. The system may further include an OFDM range engine and an OFDM receiver, and possibly a location engine if the receiver is to be used for the location calculations.

Both the OFDM range engine and the location engine may be software algorithms that can be implemented on a DSP. The location engine may process the residual phase differences and tone amplitude information by searching for a solution to a triangulation problem as described herein. The location engine may be a software algorithm that is running on a independent server. Alternatively, the software may be implemented on the OFDM transmitters or the receiver.

In some embodiments, smaller tone amplitudes may be given smaller weights in the location calculations or ignored altogether. Amplitude information may also be used to detect multi-paths. For example, access points that provide a direct line of sight will have fewer variations in the amplitudes of their pilot tones and will be preferred in any triangulation calculations in order to reduce the effects of multipath.

In embodiments using Multiple-Input and Multiple-Output (MIMO) systems, several antennas may be used to gather more data to get more accurate results. For example, a MIMO access point acting as a transmitter can use more than one antenna. Furthermore, these antennas may be used with the highest performance, lowest bit error rates, and better lines of sights.

Embodiments of the present invention may be implemented where access points or base-stations are the OFDM transmitters and the mobile device is the receiver, or the case where the mobile device is the OFDM transmitter and the access points/base-stations are the receivers, or yet other situations where the OFDM transmitters and receiver roles are shared. The latter may be useful in some systems where transmit and receive frequencies are different, and switching the role of transmitter and receiver therefore provides more data samples and better averaging. Furthermore, some systems such as WLAN can operate at different frequencies. For example, WLAN 802.11a and 802.11g use two different frequencies and using both frequencies provides more data for a more accurate location estimate. Another way to improve the location estimate is to use several wireless standards. For example, if an access point and a mobile device have UWB, WLAN, and cellular connectivity then residual phase and amplitude information may be obtained from all standards and processed to get a more accurate location value.

After the mobile device's position is calculated it is possible to interface the system with a navigation system that provides path planning and guidance. A mobile device whose position is known or calculated can also be used as an access point to locate the position of other mobile devices.

The proposed method can be applied to any system that uses multiple pilot tones, such as OFDM, including WLAN, 4G cellular, WiMax and UWB. Embodiments of the present invention may be applied to a variety packet-based methods and standards. Thus, any packet-based method may be modified such that it uses multiple pilot tones in the packet preamble or packets that have room.

If the distance between the transmitter and receiver is smaller than a threshold (e.g., the speed of light divided by the frequency difference of two tones), then the full cycle phase ambiguity issue disappears and the problem simplifies such that it is possible to calculate the actual transmitter-receiver separation distance from one transmitter. The calculated residual phase differences can then be plotted against the tone pair frequency differences and the fitted gradient of this line used to calculate the separation distance. Each tone in an OFDM signal can generate its own curve with a fitted gradient. The gradients can then be combined to provide a better estimate for the separation distance. The combination algorithm can be as simple as averaging or more complex such as Kalman filtering. A single measured phase difference can also be used to calculate the separation distance, albeit with less accuracy. Multiple transmitters and triangulation can then be used to processes the range information and obtain the object's location.

Embodiments of the present invention are complementary to GPS since it works in indoor locations, tunnels and urban canyon, where GPS signals may be weak.

The following detailed description and accompanying drawings provide a better understanding of the nature and advantages of the present invention.

DETAILED DESCRIPTION

Described herein are techniques for methods and systems for determining the location of a mobile device. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
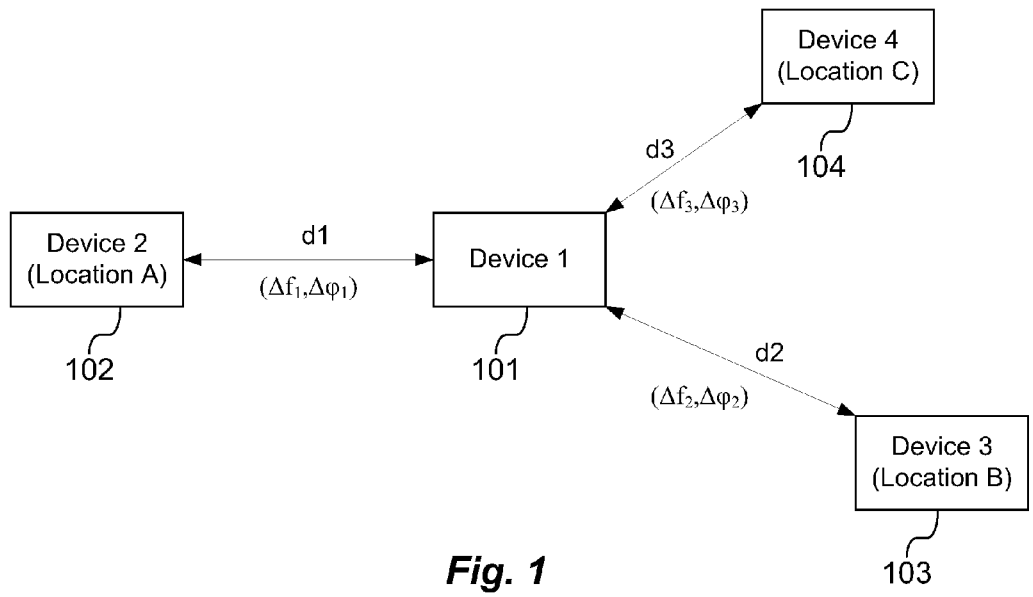
FIG. 1 illustrates a system for determining the location of an electronic device according to one embodiment of the present invention.

Embodiments of the present invention may be used to determine a location of an electronic device. Information regarding the distances between electronic devices having known locations and electronic devices having an unknown location may be used to determine the location (i.e., position) of the electronic device at the unknown location. FIG. 1 illustrates system 100 for determining the location of an electronic device according to one embodiment of the present invention. Electronic device 101 may reside in an unknown location, and it may be desirable to determine the location of the device. Embodiments of the present invention may use signals transmitted between electronic device 101 and other electronic devices at known locations (e.g., electronic devices 102-104) to determine the location of device 101. For example, in one embodiment a signal that includes multiple frequency components may be transmitted between electronic device 101 at an unknown location and electronic device 102 located at a known location A. The different frequency components, which differ in frequency by an amount $\Delta f$, will result in a measurable phase difference, $\Delta\phi$, at the receiving device that is related to the distance between the device transmitting the signal and the device receiving the signal. Accordingly, by transmitting and receiving such a signal, the distance between each electronic device with a known location and the electronic device with the unknown location may be determined For example, the signal that travels between device 101 and device 102 has different frequency components Δf1 and a corresponding measurable phase difference Δϕ1. Similarly, the signal that travels between device 101 and device 103 has different frequency components Δf2 and a corresponding measurable phase difference Δϕ2. Likewise, the signal that travels between device 101 and device 104 has different frequency components Δf3 and a corresponding measurable phase difference Δϕ3. The known location of devices 2, 3 and 4, the measured phase differences, and the frequency components can then be processed to determine distances d1, d2, d3, and the location of device 101. As described below, it is to be understood that device 101 may send out one signal, in which case Δf1=Δf2=Δf3.

In one embodiment, the electronic device 101 having the unknown location receives signals transmitted from electronic devices 102-104 to determine the unknown location. In other embodiments, the electronic device 101 having the unknown location transmits one or more signals, which are received by electronic devices 102-104 to determine the unknown location. In other embodiments, the electronic device 101 having the unknown location transmits and receives signals, and electronic devices 102-104 may transmit and receive signals. For example, some or all of the devices may both transmit and receive to improve the accuracy of the distance measurement. This provides more data to process and the averaging that result from processing more information improves the accuracy of the distance measurement since the effect of random errors is reduced. In yet another embodiment the transmitter can transmit more than once where each transmission has a different center frequency and the receiver can receive and handle these different transmissions. For example, Wireless LAN 802.11a and 802.11b use two different frequencies and if both the transmitter and receiver support 802.11a and 802.11b then using both provides better averaging. Yet another embodiment is for a multi-radio transmitter to transmit more than once where each transmission uses a different radio that supports a different wireless standard, such as WLAN and UWB. If the receiver supports these different wireless standards more data is gathered and location accuracy is improved through averaging. Alternatively, the distances between one or more devices having known locations (e.g., devices 102 and 103) and the device with the unknown location may be determined by transmitting signals from devices with known locations to the device having the unknown location, and other distances between one or more devices having known locations (e.g., device 104) and the device with the unknown location may be determined by transmitting signals from the device with the unknown location to the devices with known locations.

The locations of electronic devices 102-104 may be known by installing the devices in fixed locations and storing the location information. The location information is typically longitude, latitude and height (or altitude). It may also be x, y and z co-ordinates relative to some reference point. Alternatively, electronic devices 102-104 may have embedded GPS systems or GPS assist systems that may be used to determine the precise location of these systems using GPS techniques. Three devices with known locations may be used to determine the unknown location of a device in two dimensions (2D), and four devices with known locations may be used to determine the unknown location of a device in three dimensions (3D).

Figure 2:
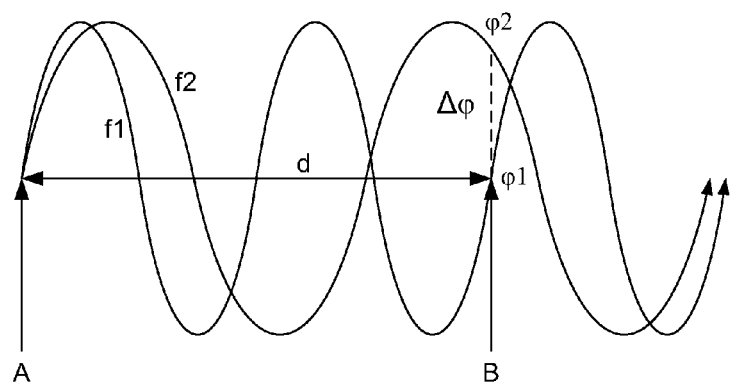
FIG. 2 illustrates the use of a pair of tones to determine a distance between electronic devices according to one embodiment of the present invention.

FIG. 2 illustrates the use of a pair of tones to determine a distance between electronic devices according to one embodiment of the present invention. A transmitted signal includes two frequency components $f_1$ and $f_2$, which may differ in frequency by an amount Δf. The different signal frequencies (or tones), f, will have different corresponding wavelengths, λ, that can be determined as follows:

$$\lambda = c/f,$$

where c is the speed of light (i.e., $3 \times 10^8$ m/s). As illustrated in FIG. 2, the transmitted signals will propagate between a device (a transmitter) at location A to another device (a receiver) located at B. The distance between the devices is the propagation distance d between A and B.

The example shown in FIG. 2 illustrates that the two signals may be initially in-phase (Δϕ=0). However, other implementations may transmit signals that are initially out of phase by some known amount. The signals propagate from the transmitter at location A to the receiver at location B, thereby traversing a distance d. When the signals arrive at location B, there is an accumulated phase difference, Δϕ, which can be measured. If the signals are represented as sinusoids, a first pilot tone f1 transmitted by the transmitter may be represented as:

$$y_1 = A \sin(w_1 t + \phi_o),$$

where $w_1$ is the frequency in radians and $\phi_o$ is the initial phase offset and may be zero. The received signal at location B is represented as:

$$y_2 = B \sin(w_1 t + \phi_o + \phi_1),$$

where $\phi_1$ is the total phase change across the distance, d, traveled. The phase of y2 is related to distance as follows:

$$\phi_1 = 2\pi d / \lambda_1$$

where $\lambda_1$ is the wavelength of the tone with frequency $f_1$. Similarly, a frequency tone $f_2$ transmitted at location A is represented as:

$$y_3 = C \sin(w_2 t + \phi_o),$$

where $w_2$ is the frequency in radians and $\phi_o$ is the initial phase offset. The initial phase offset $\phi_o$ may be zero. The corresponding received tone at location B may be represented as:

$$y_4 = D \sin(w_2 t + \phi_o + \phi_2),$$

where $\phi_2$ is the total phase change across the distance, d, traveled for frequency tone $f_2$. The phase of $y_4$ is related to distance as follows:

$$\phi_2 = 2\pi d / \lambda_2$$

where $\lambda_2$ is the wavelength of the signal with frequency $f_2$.

For both frequency tones, the distance, d, may be represented as an integer number of full wavelengths and a fractional (or residual) wavelength. For example, $\phi_1$ and $\phi_2$ may be represented as follows:

$$\varphi_1 = 2\pi d / \lambda_1 = \frac{2\pi}{\lambda_1}\left(N_1 \lambda_1 + \frac{\overline{\phi}_1}{2\pi}\lambda_1\right) = 2\pi N_1 + \overline{\phi}_1$$

$$\varphi_2 = 2\pi d / \lambda_2 = \frac{2\pi}{\lambda_2}\left(N_2 \lambda_2 + \frac{\overline{\phi}_2}{2\pi}\lambda_2\right) = 2\pi N_2 + \overline{\phi}_2$$

where $\lambda_1$ and $\lambda_2$ are the wavelengths of $f_1$ and $f_2$, $N_1$ and $N_2$ are integer number of full cycles of $f_1$ and $f_2$ (i.e., integer number of wavelengths of the signal corresponding to a distance), and $\overline{\phi}_1$ and $\overline{\phi}_2$ are the residual non-integer phases of the frequency tones $f_1$ and $f_2$ across distance, d. Accordingly, the total phase difference at location B is as follows:

$$\Delta\phi = \phi_1 - \phi_2 = \frac{2\pi d}{\lambda_1} - \frac{2\pi d}{\lambda_2} = 2\pi(N_1 - N_2) + \overline{\phi_1} - \overline{\phi_2},$$

where $(N_1-N_2)$ is the difference in the integer number of wavelengths of the two signals. If c is the speed of light, and $f_1$ and $f_2$ are the two frequency tones then:

$$\frac{2\pi d}{c}(f_1 - f_2) = 2\pi(N_1 - N_2) + (\overline{\phi_1} - \overline{\phi_2}) \quad \text{Eqn. 1}$$

Figure 3:
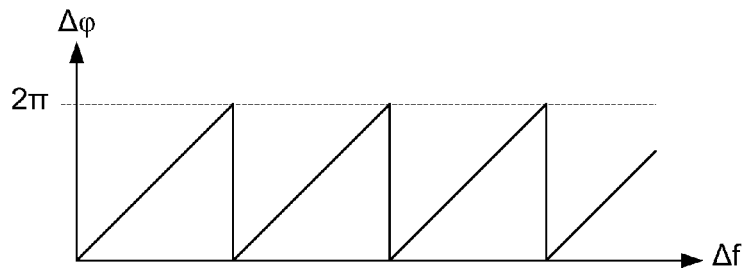
FIG. 3 illustrates differences between frequency tone pairs against the measured phase differences.

FIG. 3 illustrates differences between frequency tone pairs against the measured phase differences. This figure illustrates that the phase difference will accumulate up to $2\pi$, and then begins increasing again from zero. If the distances are small such as:

$$d \leq \frac{c}{(f_1 - f_2)}$$

one can then assume that $N_1=N_2$. In this case Eqn. 1 simplifies and it is possible to calculate d from the residual phase differences. Suppose there are n tone frequencies in a signal transmission spectrum. Then for each frequency there are n−1 cases where a residual phase difference can be calculated. For example, for frequency $f_1$ the combinations are $(f_1, f_0)$, $(f_1, f_2)$, ..., $(f_1, f_{n-1})$. The calculated residual phase difference can be plotted against the pair frequency differences to generate a straight line curve. The fitted gradient of this line can then be used to calculate distance d.

The above formulation can also be generalized to the case where initially the two signals have a known fixed phase difference. This fixed offset will not however have any effect on the line's gradient. Similarly, any phase measurement calibration errors will shift the line but will not affect its gradient. This is one of the advantages of a differential phase system in that phase differences are relative rather than absolute values.

The horizontal axis of FIG. 3 measures frequency difference from a base frequency. For a multi-frequency signal that has "n" frequency tones, FIG. 3 can be repeated for each of the "n" tones $(f_0, f_1, \ldots, f_{n-1})$, where each tone provides a gradient. The gradients can then be combined to provide a better estimate for a distance "d." The combination algorithm may include averaging or a more complex algorithm such as Kalman filtering. The total number of frequency pair combinations where residual phase difference values can be calculated is as follows:

$n(n-1)/2$.

The division by 2 is necessary since there is no difference between $(f_0, f_1)$ and $(f_1, f_0)$. The distance, d, can be calculated from a single pair measurement, as was shown in the equations above. The averaging can be performed by averaging gradients or simply using Eqn. 1 and averaging the calculated values for d. Once the distance between a transmitting device and receiving device is calculated, the process can be repeated with other nearby devices, whereby the distance between each of the other devices may also be computed.

The short distance criterion $$d \leq \frac{c}{(f_1 - f_2)}$$

is an assumption. For example, if f=1 MHz and c=3×10⁸ m/s then as long as d is less or equal to 300 m $N_1=N_2$, then d can be calculated directly from the residual phase difference calculations. If f=10 MHz then d has to be less than or equal to 30 m for $N_1$ to be equal to $N_2$. For the general problem, however, d is not assumed to be small. In this case, phase ambiguities $N_1$ and $N_2$ may be solved using integer ambiguity techniques. This phase ambiguity means that an individual transmitter can only calculate the range subject to a possible ambiguity factor. However, this ambiguity may be resolved by using multiple transmitters at known locations.

Eqn. 1 considers one frequency pair measurement for a transmission between two devices. However, it can be generalized for any pair of frequency measurements with any number of devices:

$$\frac{2\pi d_k}{c}\Delta f_{ij}^k = 2\pi\Delta N_{ij}^k + \Delta\phi_{ij}^k \quad \text{Eqn. 2}$$

Example devices may include a mobile device and an access point. In this case, $d_k$ represents the distance from the mobile device to access point k, $\Delta f_{ij}^k$ represents frequency difference between two tones $(f_i-f_j)$ using access point k, $\Delta N_{ij}^k$ represents the difference between the number of full cycles associated with frequency tones $f_i$ and $f_j$ using access point k, and $\Delta\phi_{ij}^k$ represents the residual phase difference between frequency tones $f_i$ and $f_j$ using access point k.

In the case where there are three devices used to determine the location of a device with unknown location, Eqn 2 gives:

$$\frac{2\pi d_1}{c}\Delta f_{ij}^1 = 2\pi\Delta N_{ij}^1 + \Delta\phi_{ij}^1 \quad \text{Eqn. 3}$$

$$\frac{2\pi d_2}{c}\Delta f_{ij}^2 = 2\pi\Delta N_{ij}^2 + \Delta\phi_{ij}^2 \quad \text{Eqn. 4}$$

$$\frac{2\pi d_3}{c}\Delta f_{ij}^3 = 2\pi\Delta N_{ij}^3 + \Delta\phi_{ij}^3 \quad \text{Eqn. 5}$$

From the above equations, it can be seen that the distances between the devices with known locations and the device with unknown location $d_1$, $d_2$, and $d_3$ may be determined by solving the system of linear equations. For instance, the equations may be solved by measuring the phases $\phi$ of each tone, calculating $\Delta\phi$ for the different tones, calculating $\Delta f$ from the known frequency values of the tones, and solving the system of linear equations for $d_1$, $d_2$, and $d_3$ by selecting values of N by trial and error. The correct values of N will result in a solution for the system of equations and provide the distance results.

For an n tone signal there are $n(n-1)/2$ frequency pair combinations where residual phase difference values can be calculated. Thus, if there are three access points then Eqns 3, 4 and 5 will result in $3n(n-1)/2$ equations which can be solved to find the location of the mobile device. For the general situation where there are p access points there will be $p \cdot n(n-1)/2$ equations to solve for locating the mobile device. One method to solve the equations is as follows. Given the access point locations, a positioning system may pick one access point and fix its $\Delta N_{ij}^k$ to an integer and then try different integers for the other $\Delta N_{ij}^k$ and for each integer combination try to solve the triangulation problem and see if a solution exists. For a two dimensional location problem, circles are drawn and they must intersect at one point for a valid solution. Three transmitters as access points may be used to solve this problem as mentioned above. For a three dimensional location problem spheres are drawn. Four transmitters may be used to solve this problem as mentioned above. This search process may continue until a valid solution is obtained. Other constraints may also be used during this search. For example, $|d_p+d_q|>d_{pq}$, and $|d_p-d_q|<d_{pq}$, where $d_{pq}$ is the distance between the pth and qth access points and $\|$ is the modulus operator. This search process may be carried out by a location engine which is running on a server. The physical location of the location engine may be embedded into a transmitting device, a receiving device, or an independent device such as a server. While the present description illustrates resolving the phase ambiguity using examples provided above, it is to be understood that other techniques for resolving the phase ambiguity may be used to determine the distance values.

In one embodiment, the solution to the above system of equations may be resolved by using amplitude information from the received tones to select starting values of N. For example, in one embodiment the amplitudes of the received tones may be used to determine an estimate of the distance between a transmitting and receiving device. The estimated range may then be used to select values for N that are likely solutions to the above equations. For example, in one embodiment, the amplitude of the received signal may be used to determine the received power. The power attenuation of a transmitted signal is related to range as follows:

$$P_{RX} \propto \frac{P_{TX}}{R^2}$$

Where $P_{RX}$ is the received power, $P_{TX}$ is the transmitted power, and R is the distance. However, this distance measurement may not be very accurate. Nevertheless, if the received power is known (e.g., from the amplitude) and the transmitted power is known, then the distance may be estimated. The estimated distance may be used to determine values for N in the equations above that will result in final distance results. For example, the estimated distance values may be used with the known frequency and phase differences to calculate estimated values for N, which may in turn be used to narrow the selection of values for N. The selected values for N derived from the estimated values of the distance may then be used to calculate final distance values. In one embodiment, the transmitted power may be stored as encoded data in the tones and sent from the transmitting device to the receiving device. In another embodiment, the transmitted power may be sent to a location engine and used as part of the location calculation process. It is to be understood the transmitted and received power of individual tones or the total power of transmitted and received signals may be used to determine the estimated distance.

Figure 4A:
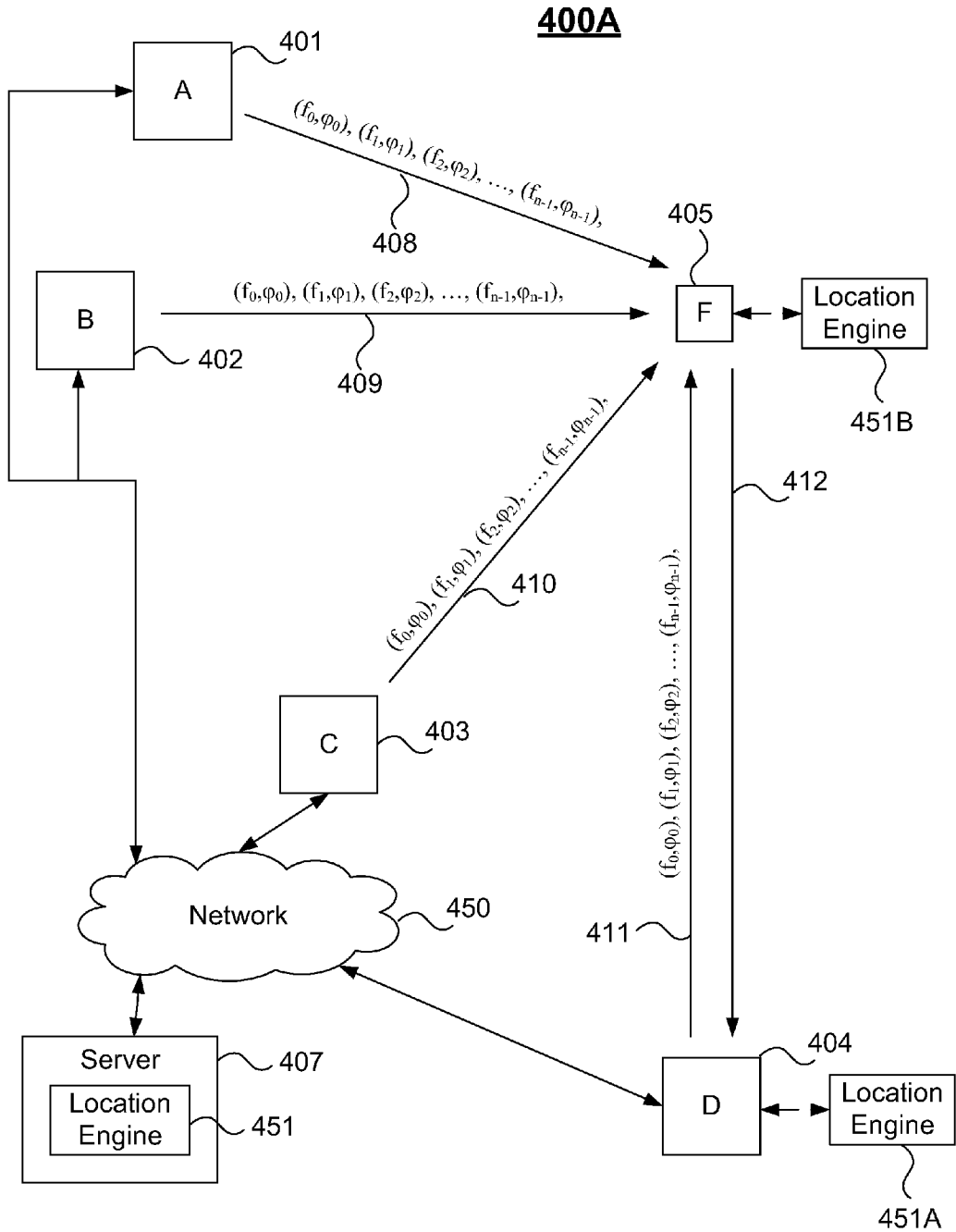
FIG. 4A illustrates a system according to one embodiment of the present invention.

FIG. 4A illustrates a system 400A according to one embodiment of the present invention. System 400A includes a first device 401 at known location A, a second device 402 at known location B, a third device 403 at known location C, a fourth device 404 at known location D, and a device 405 at unknown location F. In this embodiment, devices 401-404 may transmit signals and device 405 may receive the signals for determining the distance between each device having a known location and the unknown location of device 405. In this example, each device 401-404 transmits a signal 408-411 including a plurality of frequencies (tones):

$(f_0,\phi_0), (f_1,\phi_1), (f_2,\phi_2), \ldots, (f_{n-1},\phi_{n-1})$.

The different signals 408-411 may include the same frequencies or different frequencies as the other signals, or combinations thereof. For example, signal 408 and signal 409 may contain the same frequencies, while signal 409 and signal 410 may share only some of the same frequencies, but otherwise use different frequencies. As described in more detail below, different multi-frequency protocols may be used between different devices to determine the distance.

Device 405 receives the signals 408-411 from the devices 401-404. The signals from each device 401-404 will be received with some detectable phase change. The distance may be determined by processing the received signals. For example, in one embodiment the received signals may be converted from analog signals into digital signals and processed using digital signal processing. Processing may include determining the phase of the received frequency components, determining the frequency characteristics of the transmission channel, and determining the phase differences. Processing may further include calculating distances using the phase difference results and determining the location of the electronic device 405 by identifying a point on a plurality of circles (or spheres) of radius, $d_i$, where $d_i$ is the distance from a device having a known location to the device of unknown location, where all four circles (or spheres) intersect. The 2D locating problem requires a minimum of three circles intersecting in one point in 2D. The 3D problem requires a minimum of four spheres intersecting at one point in 3D. As illustrated in FIG. 4A, processing the signal information may be performed (in whole or in part) by a location engine. In the example illustrated in FIG. 4A, the signal information may be sent from electronic device 405 through any one of the other electronic devices (e.g., device 404) and network 450 to a server 407. Network 450 may be a wired and wireless network (e.g., a LAN or WAN) and may include the Internet, for example. Server 407 includes a location engine 451 for determining the location of electronic device 405. The location engine may receive either the raw data for the digitized signals or preprocessed data, such as extracted phase differences and estimated frequency responses, for example, for determining the location of the device. In other embodiments, the location engine may be included on one of the electronic devices 401-404 as illustrated at 451A. In yet other embodiments, the location engine may be included as part of electronic device 405 as illustrated at 451B. As described in more detail below, the location engine may include multiple components for performing different processing tasks such as phase extraction and channel estimation for each of the individual transmissions between the device 405 and the other devices 401-404 or determining the final location of device 405, for example. In some embodiments, the location engine components may be implemented on different devices in the system. In one example application, location engine 451 on server 407 may calculate the location and return this information back to the device 405. In one embodiment, embedded navigation software may help a user of device 405 navigate to a desired location (e.g., if device 405 is a cell phone or mobile wireless device). In another embodiment, device 405 may have a gyrator that can provide a differential vector of movement relative to previous positions. This can be used to minimize the errors of the system. For example, if there are system errors and the final calculated position of device 405 fluctuates widely from before then the relative movement vector of the gyrator may be used to reduce errors by adding the movement vector to a previous more reliable calculated position or by combining the latest calculated position with the gyrator movement vector.

Figure 4B:
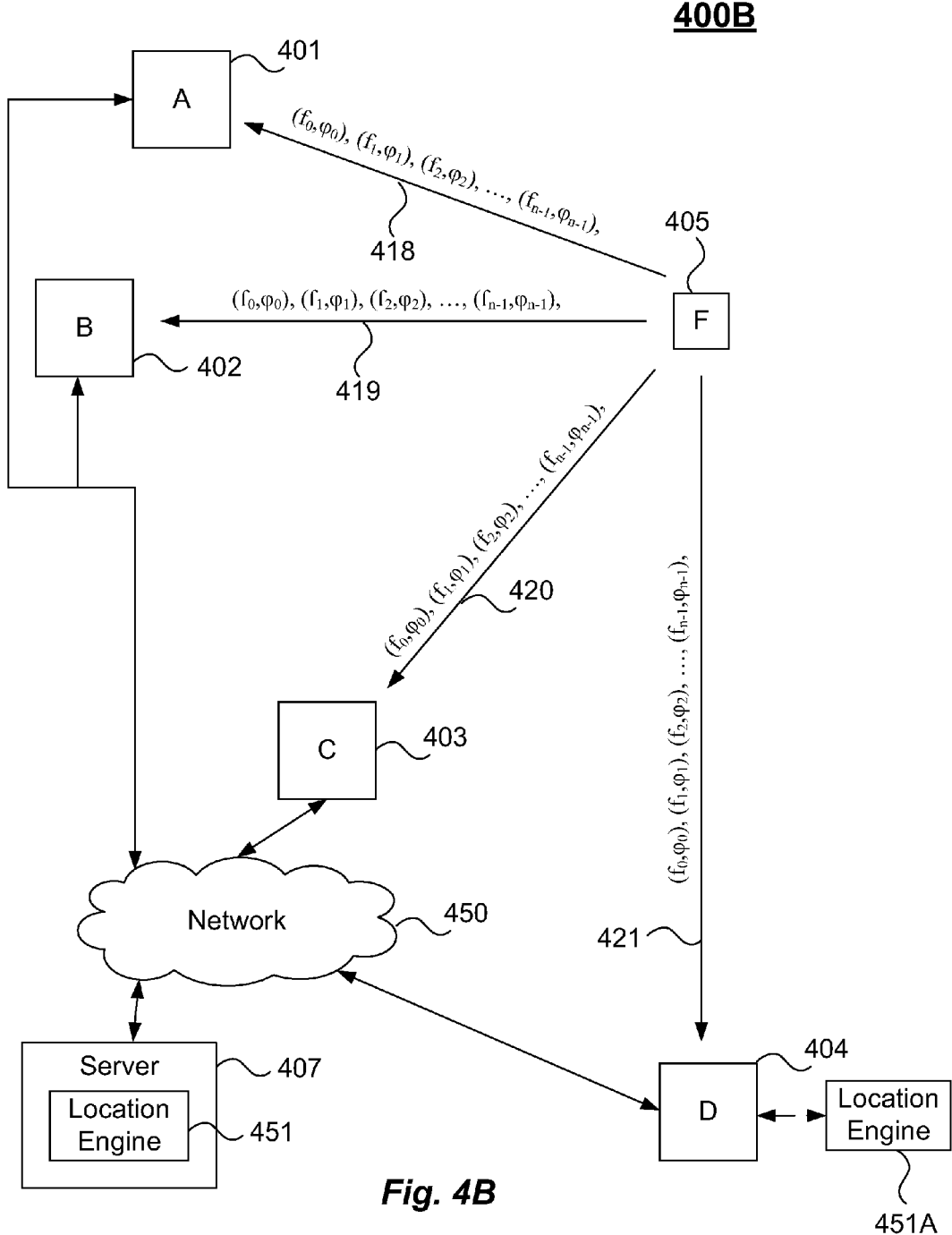
FIG. 4B illustrates a system according to one embodiment of the present invention.

FIG. 4B illustrates a system 400B according to one embodiment of the present invention. In this example system, device 405 may transmit signals and devices 401-404 may receive the signals for determining the distance between each device having a known location and the unknown location of device 405. Similar to the example in FIG. 4A, the different signals 418-421 may include the same frequencies or different frequencies, or combinations thereof Devices 401-404 receive the signals 418-421 from device 405. The signals will be received with some detectable phase change. The distance may be determined by processing the received signals as described above. In this example, the signal information is initially in each device 401-404. This information may be sent from a device where the signal is received to a server 407, to any one of the other electronic devices receiving a signal, or even back to the transmitting device for processing by a location engine or component thereof.

Figure 5:
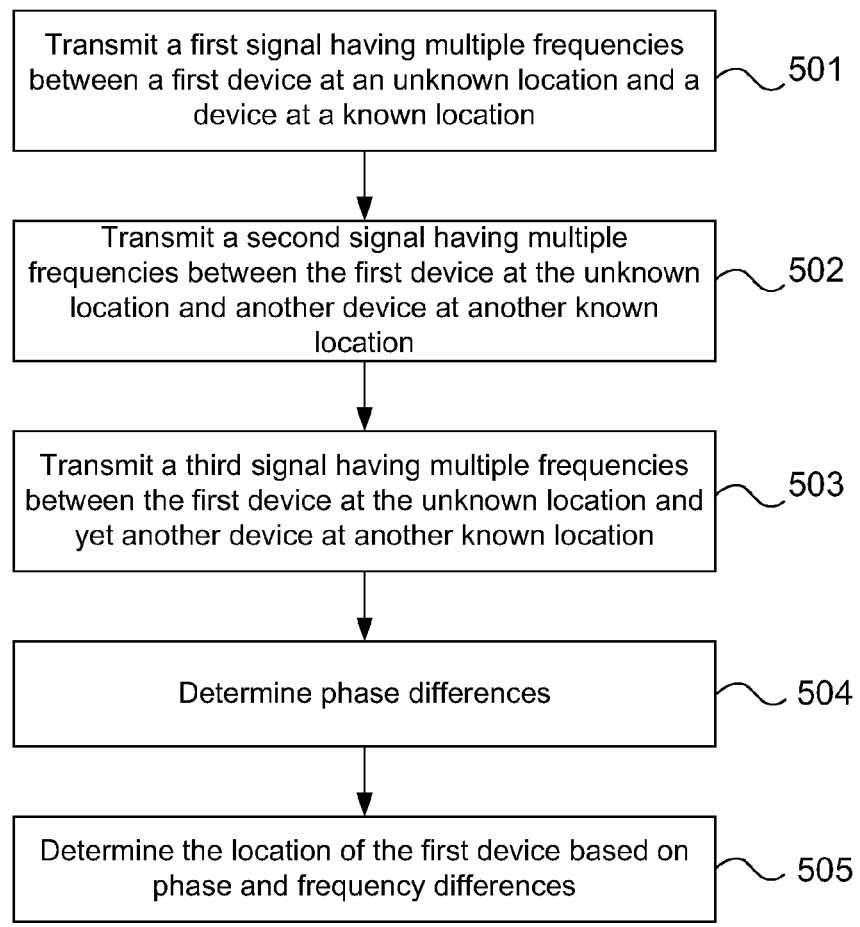
FIG. 5 illustrates a method according to one embodiment of the present invention.

FIG. 5 illustrates a method 500 according to one embodiment of the present invention. At 501, a first signal having a plurality of frequency components (tones) is transmitted between a first device at an unknown location and a device at a known location. At 502, a second signal having a plurality of frequency components is transmitted between the first device at the unknown location and another device at another known location. At 503, a third signal having a plurality of frequency components is transmitted between the first device at the unknown location and yet another device at another known location. This process may be repeated for any number of devices within range of the device at the unknown location. Four devices at known locations are sufficient for determining the location of the unknown device in 3D. At 504, the phase differences with corresponding frequency differences are determined for each transmission between a device at a known location and the device at the unknown location. At 505, the location of the first device is determined from the phase and frequency differences. For example, the system may determine where circles or spheres intersect in one point to locate the device. Additionally, the system can calculate the distances between the devices.

Embodiments of the present invention may locate different electronic devices using a variety of different multi-frequency transmission technologies. Example electronic devices that may be located include mobile electronic devices such as cellular phones, personal digital assistants (PDA), laptop computers, or any other electronic device with functionality to send or receive signals as described herein. Example electronic devices having known locations may include wireless network access points (e.g., an 802.11 access point) or base station (e.g., a cellular base station), for example. In another embodiment described in more detail below, the position of a first electronic device with an initially unknown location may be determined using multiple other devices with known locations, and the position of another device with an unknown location may be determined using the discovered position of the first device. This ad-hoc network positioning system is described in more detail below.

EXAMPLE IMPLEMENTATION

Figure 6A:
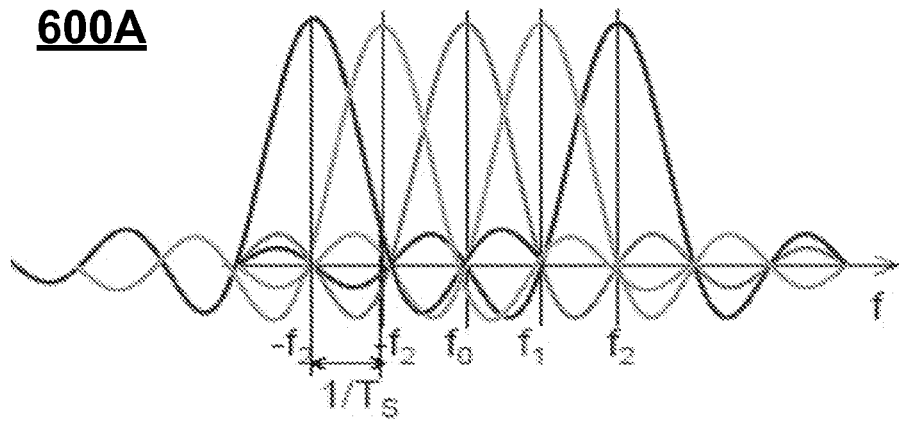
FIG. 6A-C illustrates a system according to one embodiment of the present invention.

In one exemplary implementation, embodiments of the present invention may transmit orthogonal frequency division multiplexing signals between devices to determine the distance. Orthogonal frequency division multiplexing (OFDM) is a communications technique that divides a communications channel into a number of frequency bands. OFDM is also referred to as multi-tone modulation. FIG. 6A illustrates an example of an OFDM signal having a plurality of frequencies that may be transmitted between a device having a known location and a device having an unknown location to determine position. This example OFDM signal includes a carrier frequency (or center frequency) and a plurality of sub-carriers having different frequencies. The sub-carriers are typically spread symmetrically around the carrier frequency. The frequency bands are equally spaced at a distance, in frequency, of 1/Ts, where Ts is the time period corresponding to the frequency spacing. Typically, each sub-carrier frequency is used to encode a portion of the information transmitted, and each sub-carrier frequency resides within a frequency band. All the sub-carrier frequencies are combined and transmitted simultaneously for a certain time period. The time period of transmission of a certain data set encoded in the sub-carriers across all the frequencies (and modulated at the carrier frequency) is called a symbol period, and the transmitted tones for that period is a symbol. In an exemplary OFDM system, each sub-carrier is orthogonal (independent of each other) with every other sub-carrier, differentiating OFDM from the frequency division multiplexing (FDM). Therefore, these OFDM systems allow the spectrum of each tone to overlap because the tones are orthogonal and do not interfere with each other. The overall amount of spectrum that is required is reduced because the tones overlap.

Exemplary OFDM systems spread the data to be transmitted over a large numbers of carriers, each of which is modulated at a low rate. The tones in these OFDM systems have the very special property of being the only Eigen-functions of a linear channel. This prevents interference between adjacent tones in OFDM systems. The baseband OFDM signals in a system with n frequency tones can be written as:

$$x(t) = \sum_{m=0}^{n-1} X_m \exp\left(j2\pi \frac{m}{T} t\right),$$

$$0 \le t \le T$$

Where:

$$f_m = \frac{m}{T}$$

is the central frequency of the mth sub-channel and $X_m$ is the corresponding transmitted symbol.
The signals:

$$\exp\left(j2\pi \frac{m}{T} t\right)$$

are orthogonal over [0, T] as illustrated below:

$$\frac{1}{T} \int_0^T \exp\left(j2\pi \frac{m}{T} t\right) \cdot \exp\left(-2j\pi \frac{l}{T} t\right) dt = \delta_{ml}$$

The frequency domain representation of a number of tones demonstrates that the peak of each tone corresponds to a zero level, or null, of every other tone. The result of this is that there is no interference between tones. When the receiver samples at the center frequency of each tone, the only energy present is that of the desired signal, plus whatever other noise happens to be in the channel.

Individual sub-channels can be completely separated by a receiver's Fast Fourier Transform (FFT) if there are no Inter-Symbol Interference (ISI) and Inter-Carrier Interference (ICI) introduced by the channel. Multi-path propagation can cause linear distortions, spread energy into adjacent channels, and cause ISI and ICI. Some implementations of OFDM systems are more robust to multi-path effects and prevent ISI and ICI by creating a cyclically extended guard interval called a cyclic prefix, where each OFDM symbol is preceded by a periodic extension of the signal. ISI and ICI can be eliminated when the guard interval is longer than the channel impulse response or multi-path delay. The overhead introduced by the cyclic prefix, however, increases with the length of the cyclic prefix. Some OFDM systems also reduce frequency selective fading by averaging over all frequencies.

Some embodiments of the present invention may determine the location of a mobile electronic device using several access points (or base-stations) with known coordinates. The resolution of the location of a mobile device may include the case where the access points/base-stations are OFDM transmitters and the mobile device is the receiver, or the case where the mobile device is the OFDM transmitter and the access points/base-stations are the receivers, or yet other situations where some access points/base-stations are OFDM transmitters and some are receivers. The proposed method can be applied to any system that is based on any OFDM scheme or uses multiple pilot tones including, but not limited to, 802.11, WLAN, 4G cellular, WiMax, and UWB standard. Other systems such as Bluetooth may also be used where one transmitted packet contains multiple frequency tones that are used for positioning as described herein. The proposed methodology may be used where the transmitter and receiver use the same standard and protocol, but not all access points/base stations used to determine the location of the mobile device need to use the same standard and protocol.

The accuracy of the location measurement improves as more transmissions with devices having known locations are utilized and as more frequency pair combinations are used for each transaction. The accuracy of the system can also be increased by increasing the number of OFDM frequency tones and increasing the bandwidth and frequency distance between the tones. These factors average out and reduce the effects of fading and multipath. The Media Access Control (MAC) layer typically determines the number of tones. Also, in Multiple-Input and Multiple-Output (MIMO) systems it is possible to use several antennas to gather more data and do more averaging to get more accurate results. For example, a MIMO access point acting as a transmitter can use more than one antenna. In a specific example, an access point can have 4 or more antennas. So in FIG. 4A the four transmitters are from one physical access point. But each transmitter represents one of the antenna of the multiple antenna access point. Likewise, in FIG. 4B the receivers can each be one of the antenna of a multiple antenna access point. If the location of each of the antenna of the access point that are used is known then triangulation can be used for locating the mobile device. Hybrid cases are also possible where for example in FIG. 4A some of the transmitters are from different antenna on the same physical multiple antenna access point and other transmitters are from physically different access points. Likewise, in FIG. 4B some of the receivers may be different antenna of the same physical multiple antenna access point and other receivers are physically different access points. A mobile device can also have multiple antenna so it can transmit using each antenna or receive with each antenna.

Furthermore, it is possible to use just those antennas with the highest performance, lowest bit error rates, and better line of sight. In ultra wideband (UWB) systems, a plurality of tones may be transmitted and received simultaneously as well. As mentioned above, in one embodiment the access points/base-stations are transmitters and mobile device is the receiver. In another embodiment the access points/base-stations are receivers and the mobile device is the transmitter. In another embodiment, the access points/base-stations and mobile device are transmitters and receiver. This may be advantageous in systems where transmit and receive frequencies are different. For example, some cellular systems transmit at 1 GHz and receive at 1.1 GHz. Switching the role of transmitter and receiver therefore provides more data samples and equations to solve. Also some systems such as wireless local area network (WLAN) can operate at different frequencies. For example, WLAN 802.11a and 802.11g use two different frequencies and using both frequencies provides more data for processing and getting a more accurate location. Another way to improve location accuracy is to use several wireless standards. For example, if an access point and a mobile device both have UWB and WLAN connectivity then data may be obtained from both standards and processed to get a more accurate location value.

After the mobile device's position is calculated, it is possible to interface the system with a navigation system that provides path planning and guidance. In another configuration a mobile device whose position is known or calculated can also be used as an access point to locate the position of other mobile devices.

Figure 6B:
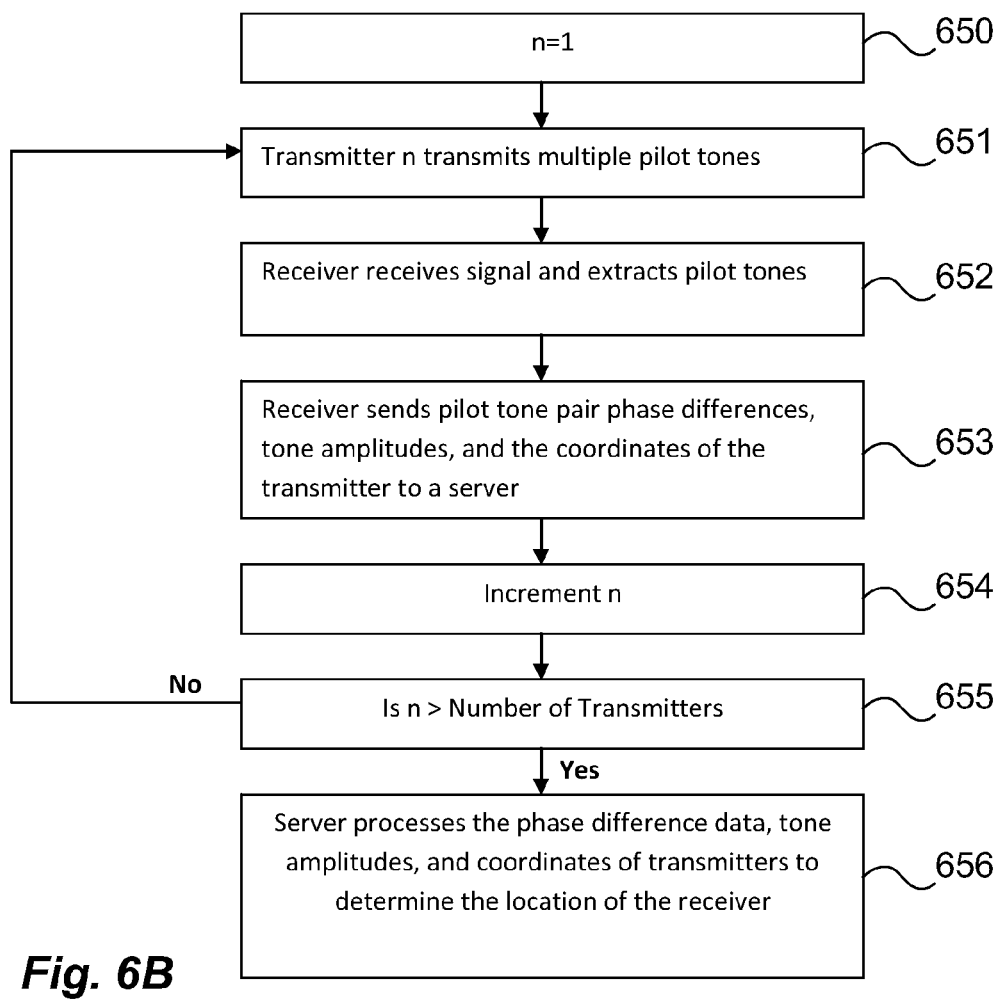

FIG. 6B illustrates another example method of determining the location of a mobile device according to another embodiment of the present invention. At 650, a number "n" representing the number of transmitters having known locations is initialized (n=1). At 651, the first transmitter transmits multiple pilot tones (e.g., OFDM tones). At 652, the receiver (e.g., a mobile device) receives the signal and extracts the pilot tones. At 653, the receiver sends the pilot tone pair phase differences, which may include a plurality of phase difference values corresponding to the phase difference between some or all of the tones, to a server. The amplitudes of the different received tones may also be sent to the server. Additionally, the coordinates of the transmitter may be sent to the server. At 654, the number "n" is incremented, indicating that the next transmitter should transmit. At 655, the number "n" is compared to the number of transmitters. If all the transmitters have not transmitted, then the process returns to step 651, and the next transmitter sends a signal and steps 652 through 654 are repeated. If all the transmitters have transmitted (n>number of transmitters), then the server processes the phase difference data, tone amplitudes, and coordinates of transmitters to determine the location of the receiver at 656.

Figure 6C:
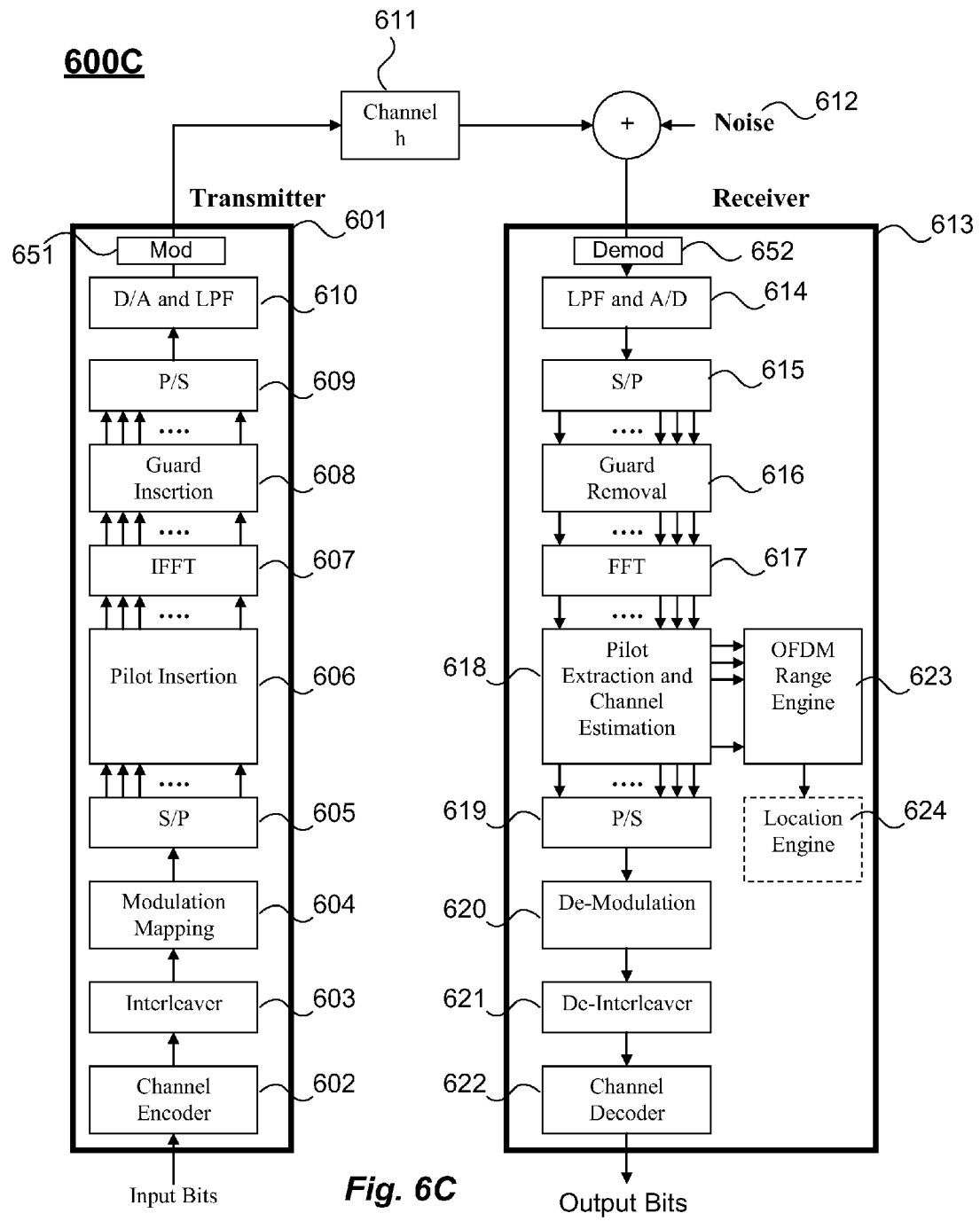

FIG. 6C illustrates a system 600 according to one embodiment of the present invention. The transmitter 601 is a OFDM transmitter. Although each standard (WLAN, WiMax, Cellular, etc.) may have slightly different implementation than this figure, the techniques for determining the location of an unknown device as applied to system 600 may be applied other standards. The receiver 603 is also a OFDM receiver including an OFDM range engine block 623 and location engine 624. The transmitter 601 receives input bits representing data such as voice, text or other kinds of information and performs channel coding 602. Channel coding protects data sent over the communication channel in the presence of noise. Channel coding is usually performed with forward error correction, where redundant bits are added to the information bits. These added bits then allow the receiver to detect and correct small errors without asking for transmission of additional data from the transmitter. Interleaving 603 may be part of the channel encoder 602 and may be used to randomize errors by exploiting frequency diversity and providing robustness against multi-path and interference. Each sub-carrier may be modulated 604 with a conventional modulation scheme (e.g. PSK/QAM). The data may be transformed from a serial representation to a parallel representation at 605. The pilot insertion block 606 inserts the pilot tones. The amplitude and phase of these pilot tones are stored and used for estimating channel attenuation and channel equalization. After the data modulation step these pilot tones become the subcarriers. The details of the implementation vary depending on the standard (e.g. WLAN, WiMax, Cellular). Some standards may use different frequencies at the same time while others may use the same frequency at different times. After the insertion step an n-point inverse fast Fourier transform (IFFT) 607 may transform the data sequence. The guard insertion block 608 may insert a cyclic extension of a time length that is larger than the expected delay spread to avoid inter-symbol and inter-carrier interference. The data is converted from a parallel representation to a serial representation 609. The Digital-to-Analog (D/A) converter 610 changes the signal into the analog domain and contains Low-Pass Filters (LPF) that match the sampling interval. After conversion, the signal is modulated at 651 by a carrier wave having a carrier frequency and transmitted. This step is also referred to as "up conversion" because the signals having a plurality of frequencies are being moved in frequency up to a higher frequency that is typically symmetric around the carrier frequency.

The wireless channel 611 in FIG. 6 is modeled as an impulse response "h" followed by complex Additive White Gaussian Noise (AWGN) 612. The receiver 614 performs demodulation of the modulated signal at 652 and Analog-to-Digital (A/D) conversion and low-pass filtering at 614. The demodulation step at 652 is also referred to as "down conversion" because the signals having a plurality of frequencies are being moved in frequency back down from the carrier frequency to their original frequencies. The data may then go through serial to parallel conversion 615 and guard removal 616. A fast Fourier transform (FFT) block 617 transforms the data back into the original form. The signals are extracted and channel estimation is performed 618. The signals and estimated channel information are then used by the OFDM range engine 623 to calculate the residual phase differences between two frequency tones and extract amplitude information for each tone. The data is converted from a parallel to a serial representation 619. The binary information is obtained after demodulation 620 that demodulates the frequency sub-carriers, de-interleaving 621, and channel decoding 622. Blocks 651 and 652 perform carrier frequency up/down conversion, whereas 604 and 620 carry out sub-carrier modulation and demodulation.

The receiver 613, optionally, has a location engine 624. This location engine 624 may be used in instances where the receiver 613 is used for location calculation via methods such as triangulation search methods. Thus, the location engine uses its calculated residual phase differences and tone amplitude information for each of the access points to calculate its own position. If the receiver 613 does not have a location engine 624 to calculate its own position it can transmit the calculated residual phase differences and tone amplitude information to a network server or another mobile device for location calculations.

Time and the index representing the access point are not shown in the equations below to avoid repetition. For example, Eqn 2 used index k to refer to a specific access point. A time index also means representing a received signal Y as Y(t) where t represents a particular time instance. Suppose that the received signal by the receiver in FIG. 6 is represented by Y. Then Y can be represented as:

$$Y = X \cdot H + W$$

Figure 7:
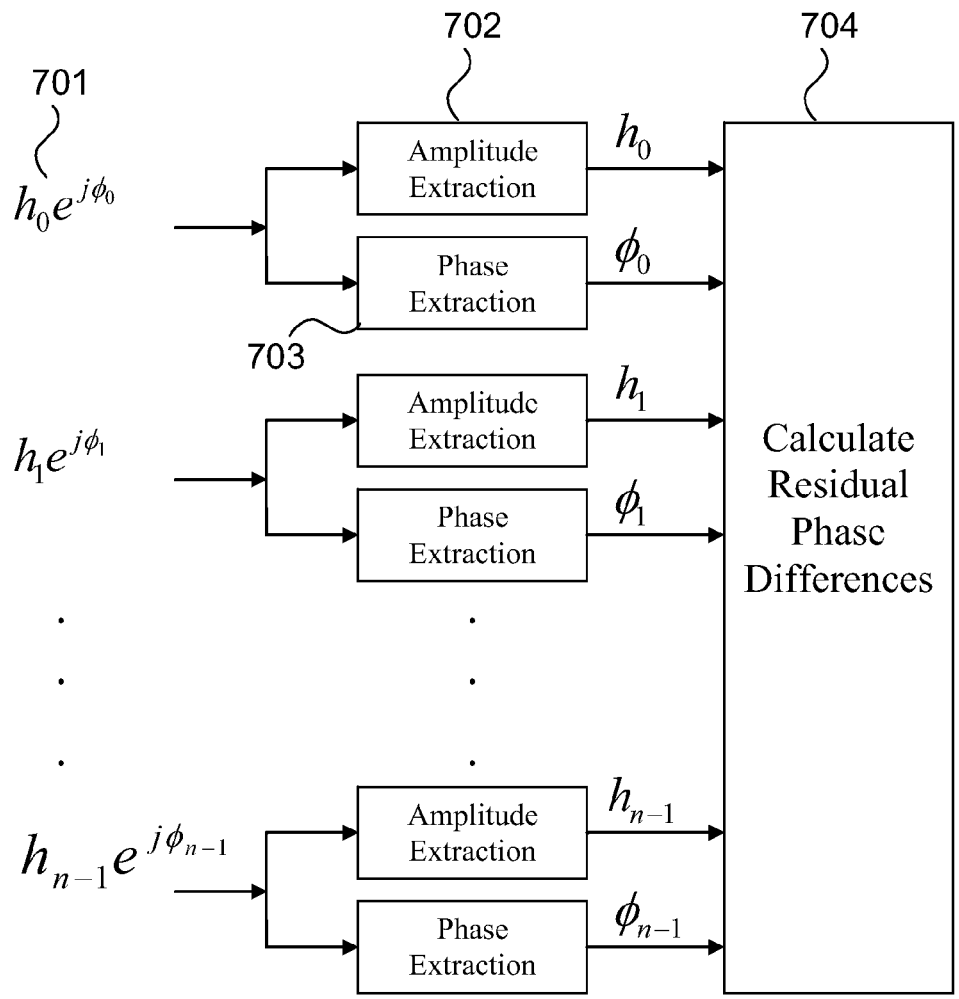
FIG. 7 illustrates a range engine according to one embodiment of the present invention.

Where:

$$Y = [y_0, y_1, \ldots, y_{n-1}]$$

is the received OFDM symbol vector and:

$$X = [x_0, x_1, \ldots, x_{n-1}]$$

is the transmitted OFDM symbol vector and:

$$H = [h_0 e^{j\phi_0}, h_1 e^{j\phi_1}, \ldots, h_{n-1} e^{j\phi_{n-1}}]$$

is the frequency response vector of the channel and:

$$W = [w_0, w_1, \ldots, w_{n-1}]$$

is the Additive White Gaussian Noise (AWGN) vector. FIG. 7 illustrates a range engine 700 according to one embodiment of the present invention. Channel estimation algorithms in OFDM provide estimates for H. The OFDM range engine 700 then uses the estimated channel frequency response vector 701 to extract phase information at 703 to calculate the residual phase differences, $\Delta\phi_{ij}^k$, of Eqn. 2 and extract amplitude information at 702 for each tone. The $\Delta f_{ij}^k$ tone frequency differences of Eqn. 2 can be calculated based on the spacing between OFDM tone subcarriers. The amplitude information may also be used to estimate range between devices as describe above, for example, where the range may be estimated by correlating the transmitted power and the received signal amplitude with the distance traveled. Additionally, in one embodiment the tone amplitude information may be used to reduce the effects of noise, fading or multi-path. For example, the impact of such adverse channel effects may be reduced by weighting the tones based on received amplitudes, which may be normalized, for example. In one embodiment, the amplitudes of the received tones may be averaged, and weights may be assigned to each tone based on the amplitude of each tone relative to the average amplitude. In another embodiment, the highest and lowest received tone amplitudes are determined, and weights are assigned to each tone based on the amplitude of the tone relative to the range of received amplitudes. Accordingly, smaller received amplitudes may be given smaller weights in the location calculations or ignored altogether because it could represent noise or fading Amplitude information may also be used to detect multi-paths. For example, the variation in amplitude across all the received tones may be determined Access points that provide a direct line of sight will have fewer variations in the amplitudes of their tones and will be preferred in the triangulation calculations in order to reduce the effects of multipath.

The example embodiment shown in FIG. 7 uses OFDM. Other packet-based methods and standards may be utilized as well. Many packet-based methods may be modified such that it uses n pilot tones in the packet pre-amble or packets that have room. In one embodiment the transmitters may be nearby WLAN or 4G cellular or WiMax or UWB access points/base-stations, and the mobile device is a portable electronic device such as a cellular phone, personal digital assistant ("PDA"), or watch, or any computer based system, for example.

Figure 8:
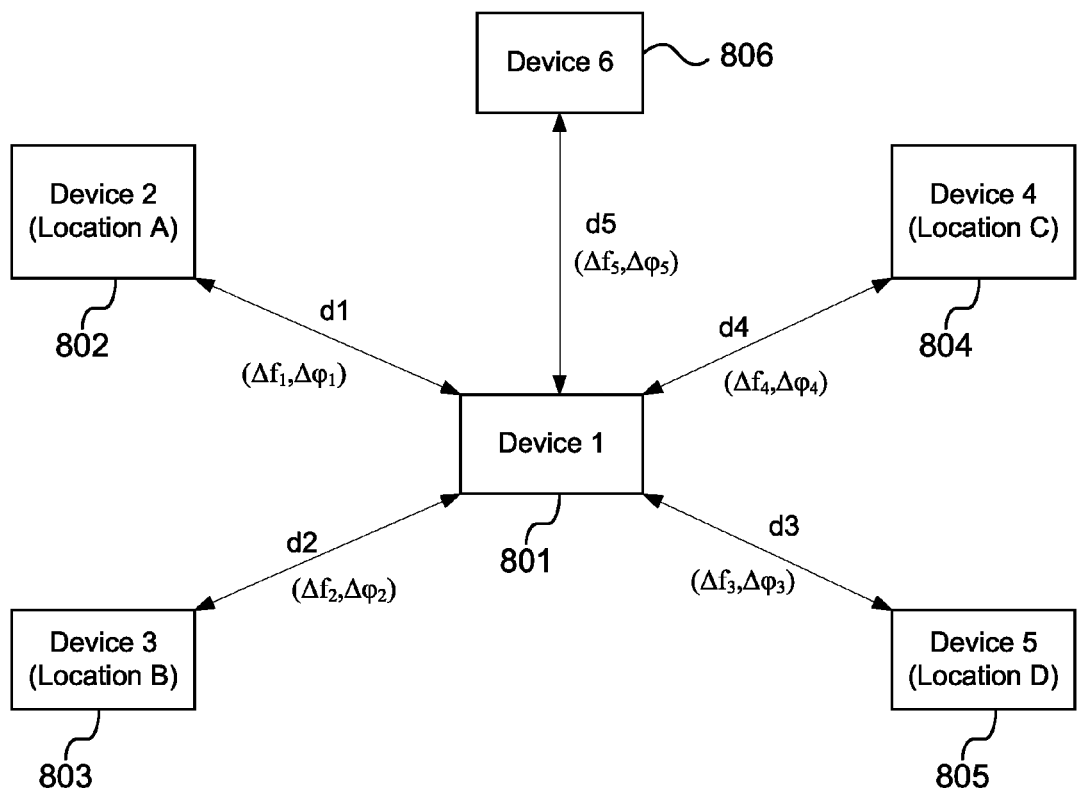
FIG. 8 illustrates determining the location of an electronic device according to one embodiment of the present invention.

FIG. 8 illustrates determining the location of an electronic device according to one embodiment of the present invention. FIG. 8 illustrates that the distance between one device 801 having an unknown location may be used to determine the location of another device 806 having an unknown location if the first device is within range of devices with known locations or if the device has a GPS technology. For example, tones having different frequencies may be transmitted between devices 802, 803, 804, and 805 and device 801, resulting in corresponding phase differences that may be used to determine the distances between the devices at known locations and device 801. Accordingly, the location of device 801 may be determined Additionally, tones having different frequencies may be transmitted between device 801 and device 806, resulting in corresponding phase differences. In one embodiment, if three other devices having known locations are within range (e.g., devices 802, 803, and 804 are in range, but device 805 is not in range), the location of device 806 may be determined using tones from each of these devices and tones from device 801. As a specific example, devices 801 and 806 may be mobile devices and devices 802-805 may be wireless access points. The location of mobile device 806 may be determined using a combination of signals from one or more access points and one or more other mobile devices that have known locations based on other access points. In one embodiment, if a mobile device having an unknown location is out of range of all access points having known locations, the location of the mobile device may still be determined if the mobile device is within range of other mobile devices that are within range of access points with known locations. Similarly, if a mobile device having an unknown location is out of range of all access points having known locations, the location of the mobile device may still be determined if the mobile device is within range of other mobile devices with known locations obtained through GPS. In that example, one or more mobile devices may have known locations using GPS technology (or position assisted GPS), and the location of another mobile device that does not have GPS may be determined using the techniques described above.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of determining a location of an electronic device, the method comprising:
    transmitting three or more signals between a first electronic device at an unknown location and a second electronic device comprising at least three antennas at known locations, the three or more signals each including a plurality of simultaneous tones having different frequencies;
    determining a first phase difference between at least two tones having a first frequency difference in the three or more signals accumulated during transmission between the first electronic device and a first antenna of the second electronic device;
    determining a second phase difference between at least two tones having a second frequency difference in the three or more signals accumulated during transmission between the first electronic device and a second antenna of the second electronic device;
    determining a third phase difference between at least two tones having a third frequency difference in the three or more signals accumulated during transmission between the first electronic device and a third antenna of the second electronic device; and
    determining the location of the first electronic device using said first, second, and third phase differences and said first, second, and third frequency differences.

2. The method of claim 1 further comprising:
    transmitting one or more signals between the first electronic device and a third electronic device comprising a fourth antenna at a known location, the one or more signals each including a plurality of tones having different frequencies, the third electronic device different than the second electronic device; and
    determining a fourth phase difference between at least two tones having a fourth frequency difference in the one or more signals accumulated during transmission between the first electronic device and the fourth antenna of the third electronic device, wherein said determining the location further comprises using the fourth phase difference and the fourth frequency difference.

3. The method of claim 1, wherein the at least three antennas comprise a fourth antenna at a known location, the method further comprising:
    determining a fourth phase difference between at least two tones having a fourth frequency difference in the three or more signals accumulated during transmission between the first electronic device and the fourth antenna of the second electronic device, wherein said determining the location further comprises using the fourth phase difference and the fourth frequency difference.

4. The method of claim 1, wherein transmitting the three or more signals between the first electronic device and the second electronic device comprises sending the signals from each antenna of the second electronic device and receiving the signals at the first electronic device.

5. The method of claim 4, wherein each of the three or more antennas acts as a transmitter and a receiver of the second electronic device, wherein transmitting the three or more signals between the first electronic device and the second electronic device further comprises sending the signals from the first electronic device and receiving the signals at each antenna of the second electronic device.

6. The method of claim 1, wherein transmitting the three or more signals between the first electronic device and the second electronic device comprises sending the signals from the first electronic device and receiving the signals at each antenna of the second electronic device.

7. The method of claim 1, wherein determining the location of the first electronic device comprises sending signal information including the first, second, and third phase differences and the first, second, and third frequency differences to a location engine that processes the phase differences and frequency differences to determine distances between the first electronic device and each of the first, second, and third antennas of the second electronic device, the determined distances being used to triangulate the location of the first electronic device.

8. The method of claim 7, wherein the location engine to which the signal information is sent is located on a server communicatively coupled to at least one of the first and second electronic devices through a network.

9. The method of claim 7, wherein the location engine to which signal information is sent is located on one of the first and second electronic devices.

10. The method of claim 1, wherein the first electronic device is a mobile device, wherein the second electronic device is an access point, wherein the three or more antennas are antennas at known locations of the access point.

11. The method of claim 1, wherein a set of antennas with a best performance determined based on bit error rates is utilized.

12. The method of claim 1, wherein the location of the first electronic device is determined based on distances between the first electronic device and the first, second, and third antennas of the second electronic device, each of the distances being determined by solving a system of linear equations based on the phase differences, wherein the system of linear equations is solved by trial and error by inputting integer numbers representing full cycles for each tone.

13. The method of claim 1, wherein the first electronic device and the second electronic device utilize a plurality of wireless standards, the plurality of wireless standards comprising Ultra-Wideband and Wireless Local Area Network.

14. The method of claim 1, wherein the plurality of tones included in the three or more signals have a known phase difference at a time of transmission, wherein the location of the first electronic device is determined based on distances between the first electronic device and the first, second, and third antennas of the second electronic device, each of the distances being determined based on the measured accumulated phase differences and the known phase difference.

15. The method of claim 1, wherein the transmitted signals between the first electronic device and the second electronic device are analog signals, the method further comprising converting the analog signals into digital signals, wherein the phase differences are determined based on the converted digital signals.

16. The method of claim 1 further comprising interfacing the first electronic device with a navigation system to provide path planning and guidance when the location of the first electronic device is determined.

17. The method of claim 1 further comprising using the first electronic device as an access point of a known location to locate positions of other mobile devices when the location of the first electronic device is determined.

18. The method of claim 1, wherein the three or more signals comprise orthogonal frequency division multiplexed signals.

19. The method of claim 1 further comprising:
   using amplitudes of each of the tones of the three or more signals to determine a received power, and
   using an attenuation in the received power to determine distances between the first electronic device and the first, second, and third antennas of the second electronic device,
   wherein determining the location of the first electronic device comprises using the determined distances to triangulate the location of the first electronic device.

20. The method of claim 19, further comprising assigning weights to each tone of the signals based on the amplitude of each tone relative to an average amplitude in order to reduce the effects of noise, fading, or multipath.

* * * * *